US006750388B2

(12) United States Patent
McKasah

(10) Patent No.: US 6,750,388 B2
(45) Date of Patent: Jun. 15, 2004

(54) TRANSPORTABLE BELL ARRANGEMENT

(75) Inventor: Wadih McKasah, Hornsby (AU)

(73) Assignee: Wedding Bells Australia Pty Ltd, Berowra (AU)

( * ) Notice: Subject to any disclaimer, the term of this patent is extended or adjusted under 35 U.S.C. 154(b) by 0 days.

(21) Appl. No.: 10/319,019

(22) Filed: Dec. 12, 2002

(65) Prior Publication Data

US 2003/0172796 A1 Sep. 18, 2003

(30) Foreign Application Priority Data

Mar. 14, 2002 (AU) ........................................ 2002100205

(51) Int. Cl.$^7$ ................................................ G10H 7/00
(52) U.S. Cl. .......................... 84/600; 84/103; 84/407; 211/85.6; 368/273; 705/5
(58) Field of Search .................... 84/103, 406, 407, 84/600, 453; 211/85.6; 368/273; 705/5, 6

(56) References Cited

U.S. PATENT DOCUMENTS

| 2,598,574 | A | * | 5/1952 | Marra | 84/103 |
|---|---|---|---|---|---|
| 2,649,826 | A | * | 8/1953 | Van Bergen | 84/725 |
| 3,769,870 | A | * | 11/1973 | Huber | 84/103 |
| 4,092,893 | A | * | 6/1978 | Beach | 84/743 |
| 5,266,732 | A | * | 11/1993 | Suzuki | 84/103 |
| 5,471,006 | A | * | 11/1995 | Schwartz et al. | 84/609 |
| 5,739,457 | A | * | 4/1998 | Devecka | 84/743 |
| 5,908,997 | A | | 6/1999 | Arnold et al. | |
| 6,288,317 | B1 | * | 9/2001 | Willis | 84/600 |
| 6,363,351 | B1 | * | 3/2002 | Moro | 705/1 |

FOREIGN PATENT DOCUMENTS

DE         2902606 A1     1/1979

OTHER PUBLICATIONS

Australian Examiners 1st report relating to AU Innovation Patent No. 2002100205, 2 pages, Dec. 9, 2002.
"The Guild of Carillonneurs in North America (GCNA)", http://www.gcna.org//, 3 pages.
"The Little Bells of Christ Church", http://www.cccdub.ie/bells/tower/littlebells.html, 2 pages.
"Christ Church's new bells ring in changes", Irish Independent Article Feb. 24, 1998, 1 page.
"Midi Carillon Computer", clock–o–matic, 3 pages.
"Midi Carillon Computer", Technical Data, clock–o–matic, 1 page.
Bagot Bellfoundries: Travelling Carillon, 2 pages.
Bagot Bellfoundries: A Profile, 4 pages (1995).
"The Carillon: From Antiquity to the Present . . . Bells . . . The Song of Humankind". The Guild of Carillonneurs in North America, 3 pages.
"Travelling Carillon of Prague", http://web.archive.org/web/20020213050150/http://www.carillon–museum.nl/praag.htm.
Bell Installations–Carillons–Tower Clocks: Clock–o–matic, http://www.clock–o–matic.com/products.htm.
Unsworth, Genine; http://www.abc.net.au/southwestwa/stories/s636728.htm; printed May 12, 2002; 1 page.
http://203.108.4.105/~streetorgan/; printed May 12, 2002; 1 page.
http://members.ozemail.com.au/~streetorgan/bbp5.htm; May 12, 2002; 1 page.

\* cited by examiner

*Primary Examiner*—Jeffrey Donels
(74) *Attorney, Agent, or Firm*—Townsend and Townsend and Crew, LLP

(57) ABSTRACT

A method of generating music using a plurality of bells (312, 314) is disclosed. The method comprises the steps of mounting said plurality of bells (312, 314), in playable dispositions, on a mobile platform (302), transporting the mobile platform (302) to a venue, and striking, dependent upon electronic control, corresponding ones of the plurality of bells (312, 314).

10 Claims, 5 Drawing Sheets

US 6,750,388 B2

TRANSPORTABLE BELL ARRANGEMENT

TECHNICAL FIELD

The present invention relates generally to provision of music, for a fee, at different venues and, in particular, to provision of music using bells as musical instruments.

BACKGROUND

Festive celebrations such as weddings have traditionally been conducted at churches. Churches often are equipped with arrangements of bells fixed in place in bell towers, and celebrators who make use of such venues are able to enjoy the emotional and stirring bell music emanating from the bell towers. It is noted, however, that a significant number of churches do not have the aforementioned bell arrangements, and either have no bells, or only a few bells which do not provide the desired type or quality of bell music previously noted.

Weddings are also increasingly conducted at venues other than churches, for reasons of convenience, cost or merely that the celebrators desire to do something different. Notwithstanding the benefits gained in the eyes of the celebrators by using such alternate venues, the celebrators are nonetheless deprived of the grandeur and majesty of the bell music previously available at church venues.

Celebrators have been able to avail themselves of alternate types of music at the non-church venues. The alternate music is typically pre-recorded music recorded on magnetic tape, Compact Discs (CDs), or other recording media. Alternately, travelling bands and small orchestras are also available for provision of celebratory music.

Notwithstanding the availability of travelling bands, orchestras and pre-recorded music, music provided at occasions such as weddings that are held away from traditional church venues, or at churches which have limited or no church bells, suffers from a significant diminution in the perceived grandeur of the music, since electronically reproduced pre-recorded music and travelling orchestras are unable to reproduce the perceived quality of genuine church-bell generated music.

Thus, a need exists for provision of genuine bell music at venues used for celebratory functions including, in particular, wedding celebrations.

SUMMARY OF THE INVENTION

According to one aspect of the invention, there is provided a method of generating music using a plurality of bells, the method comprising the steps of:
   mounting said plurality of bells, in playable dispositions, on a mobile platform;
   transporting the mobile platform to a venue; and
   striking, dependent upon electronic control, corresponding ones of the plurality of bells.

According to another aspect of the invention, there is provided a mobile church bell platform, adapted to deliver music at a desired venue using a plurality of church-type bells, the platform comprising:
   the mobile platform;
   said plurality of bells, coupled to the platform in playable dispositions;
   a sound sub-system functionally adapted to strike the bells, thereby producing church bell-type music dependent upon music data from one of a music storage memory and a music synthesizer; and
   an information system for at least one of (i) providing information relating to the location of the venue and a scheduled time at which the music is to be delivered, (ii) taking orders for future music delivery at other venues, and (iii) recording a payment for said delivery of the music at said venue.

Other aspects of the invention are disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
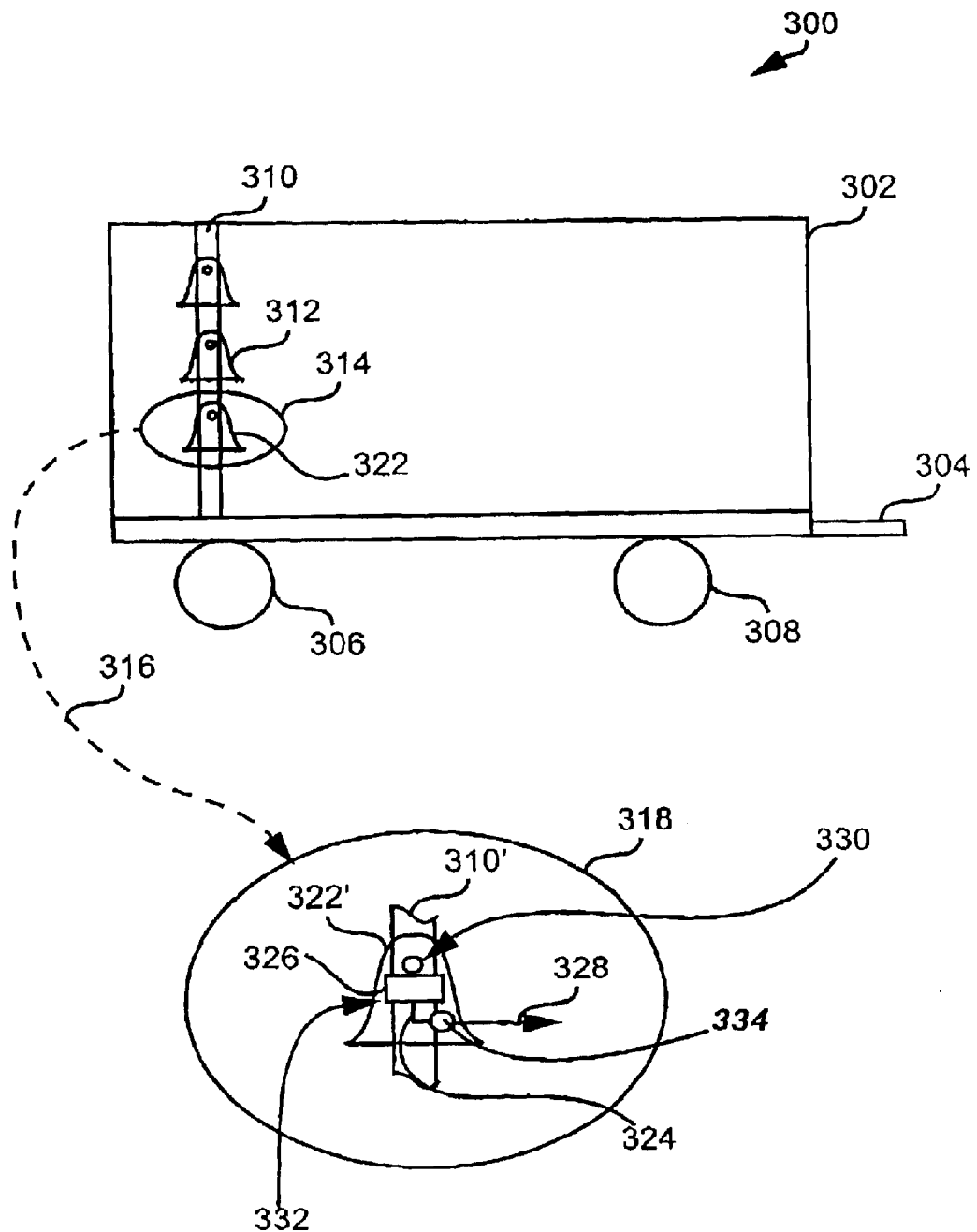
FIG. 1 shows an arrangement of church-type bells mounted in a mobile platform.

Where reference is made in any one or more of the accompanying drawings to steps and/or features, which have the same reference numerals, those steps and/or features have for the purposes of this description the same function (s) or operation(s), unless the contrary intention appears.

FIG. 1 shows an arrangement 300 in which a plurality of church-type bells 312 are mounted in a mobile platform 302. Bells 312 and 322 are mounted on a vertical strut 310 that forms part of a framework (not shown) for mounting up to 50 bells in playing disposition. The mobile platform 302 is mounted on wheels 306 and 308, and is typically towed by another vehicle using a tow bar 304 or other such inter-vehicle connection arrangement. Bell details 314 are shown, as depicted by a dashed arrow 316, in more detail within an inset 318. The inset 318 shows the bell 322' mounted on the vertical strut 310' by means of a horizontal attachment shaft 330. This connection arrangement is one example only, and other arrangements using, for example, rings fixed to the top of the bell can also be used. In a preferred arrangement, the bells 312, 322, . . . are rigidly mounted to the vertical strut 310, however other arrangements in which the bells are able to move about their mounting positions can also be used. An illustrative bell clapper 332 is also attached to the vertical strut 310', where the clapper 332 comprises a drive housing 326 containing a mechanism (not shown) for driving that part of the clapper arrangement which strikes the bell 322'. Emanating from the housing 326 is an arm 324, at the end of which is a clapper knob 334. When the clapper arrangement 332 is energized, the driving arrangement in the housing 326 forces the arm 324 and the clapper knob 334 in a direction depicted by an arrow 328, thereby striking the bell 322'. Different clapper arrangements, known in the art of bell clappers, can be used instead of the depicted arrangement.

The arrangement 300 allows for up to 50 bells to be mounted on the mobile platform 302. The bells are individually tuned and harnessed internally within the framework of which the vertical strut 310 forms apart. The bells are arranged strategically within the mobile platform 302 to provide for optimum acoustics and faithful emission of sound from the mobile platform 302.

The framework and external facade (not shown) for the mobile platform 302 can be made from a variety of materials. In one arrangement, for example, the internal framework, of which the vertical strut 310 forms a part, is constructed from timber, and the external facade (not shown) is constructed from imitation sandstone. This arrangement provides a strong and yet light transportable structure. Openings in the external cladding, using louvers, hinged panels, and the like, are provided in order to ensure that the high quality music expected can efficiently emanate from the vehicle when it is located at the desired venue, and to show the bells to aesthetic advantage.

Figure 2:
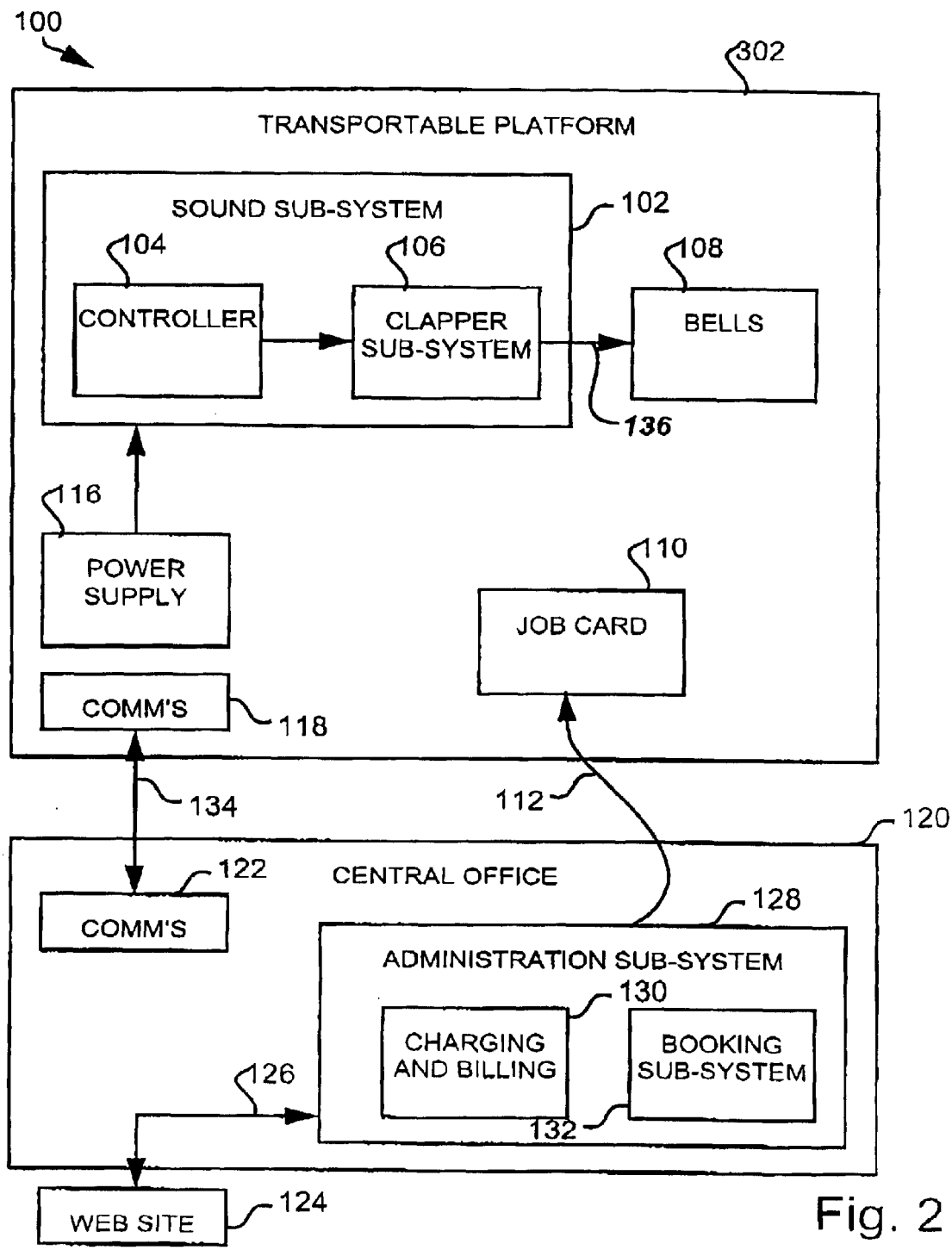
FIG. 2 shows a functional block diagram of the mobile platform and an associated central office.

FIG. 2 shows a functional block diagram of the mobile platform 302 and of an associated central office 120. The mobile platform 302 contains a sound sub-system 102 comprising a controller 104 that is functionally connected to a clapper sub-system 106. The clapper sub-system 106 is functionally connected to a plurality of bells 108 as depicted by an arrow 136. The sound sub-system 102 receives power from a power supply 116. The operator of the transportable platform 302 uses a job card 110 to provide details of venues at which the bell music is to be provided, as well as payment and other relevant information. In the event that there is a failure of the power supply 116, a manual backup arrangement is provided based upon a manually driven drum barrel, which enables the bells 108 to be manually operated.

A communication sub-system 118 is provided in the mobile platform 302, in order to provide communication with a similar communication sub-system 122 located in the central office 120.

From an operations point of view, the central office 120 represents the commercial point of contact for customers and operations staff, and the mobile platform 302 is typically one of a fleet of such platforms which are transported to various venues in order to provide bell music as a service to celebrators.

The central office 120 contains an administration sub-system 128 which has a booking sub-system 132 upon which bookings for events are recorded. These bookings arc printed on the job card(s) 110 associated with the mobile platform(s) 302. A charging and billing sub-system 130 attends to matters of charging for services rendered, as well as generating bills to be sent to customers for subsequent payment. Updated booking and charging information is provided on a daily, weekly or other convenient basis to the operator(s) of the mobile platform(s) 302 by printing new job cards(s) 110 as required.

The central office 120 also includes a connection 126 to a company web site 124 which is maintained on a remote server (not shown) over the Internet. The central office 120 is, therefore, equipped to deal with commercial transactions with customers using conventional systems such as telephone and facsimile (not shown) as well as transactions over the Internet web site 124. Commercial transactions over the web site are described in more detail with reference to FIG. 5.

The communications sub-systems 118, 122 and the associated communication link 134 enable operators of the mobile platform(s) 302 to be in constant communication with the central office 120, and the operators are thereby able to respond to changing circumstances, such as cancelled arrangements due to weather, emergencies (such as unscheduled program changes), and so on.

The power supply 116 can be implemented using a portable power-pack using batteries, or using a locally source of mains power (typically 240 volts AC) provided at the venue itself.

Figure 3:
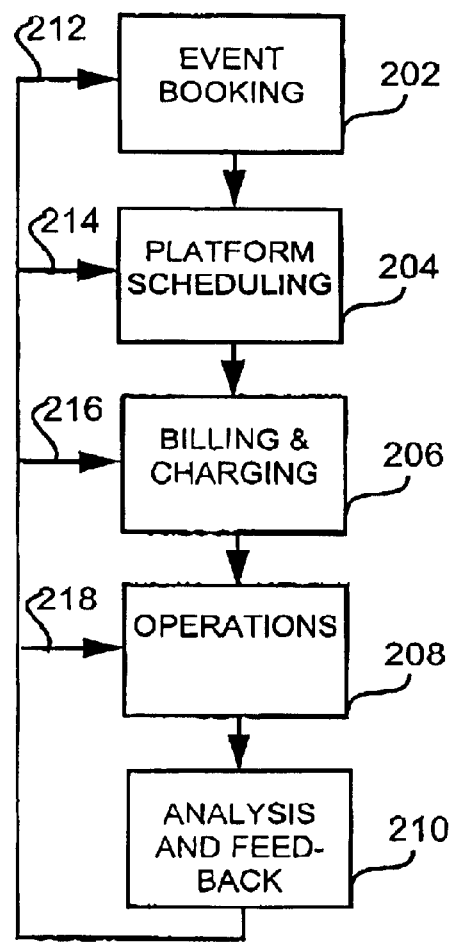
FIG. 3 shows a flow chart of a commercial process for provision of music services.

FIG. 3 shows a flow chart of a commercial process 200 underpinning the provision of music services using the arrangements shown in FIGS. 1 and 2. The process 200 commences with a step 202 which books, on the booking sub-system 132, events at which bell music is required. Such events can include occasions catered for by the hospitality industry in general, such as conferences and meetings, however more typically the events are social functions, and in particular functions such as weddings. A subsequent step 204 schedules the mobile platform(s) 302, which may be either a single platform, or a fleet of platforms, according to bookings received. Thereafter, a step 206 performs billing and charging of the booked events. The charging process involves determination of a fee for particular events, depending, for example, on the distance of the venue from the central office 120, and the time estimated for the duration of the particular occasion. The billing operation consists, on the other hand, of preparation of invoices, posting thereof to the clients and so on. Although billing and charging operations are depicted as occurring before the operations step 208, the billing process can equally occur after the operations step 208.

The operations step 208 represents the actual operations of the business, namely sending out the mobile platforms 302 to the various venues, providing music at the venues and so on. A subsequent step 210 performs analysis of the operations performed in the step 208 in order to assess possible improvements for future operations. The step 210 feeds back the analysis information, as depicted by arrows 212 to 218, to respective steps 202 to 208. In this manner, the business process depicted by the process 200 continuously assesses itself and improves performance.

One aspect of the business which is not explicitly depicted in FIG. 3 is that of advertising. Advertising for the business of providing bell music can be performed by placing advertisements in newspapers and magazines, as well as by arranging advertisements on radio and television. Furthermore, live exhibitions of the mobile platform 302 and its capabilities can be arranged, and at these particular advertising venues orders can also be taken directly.

Figure 4:
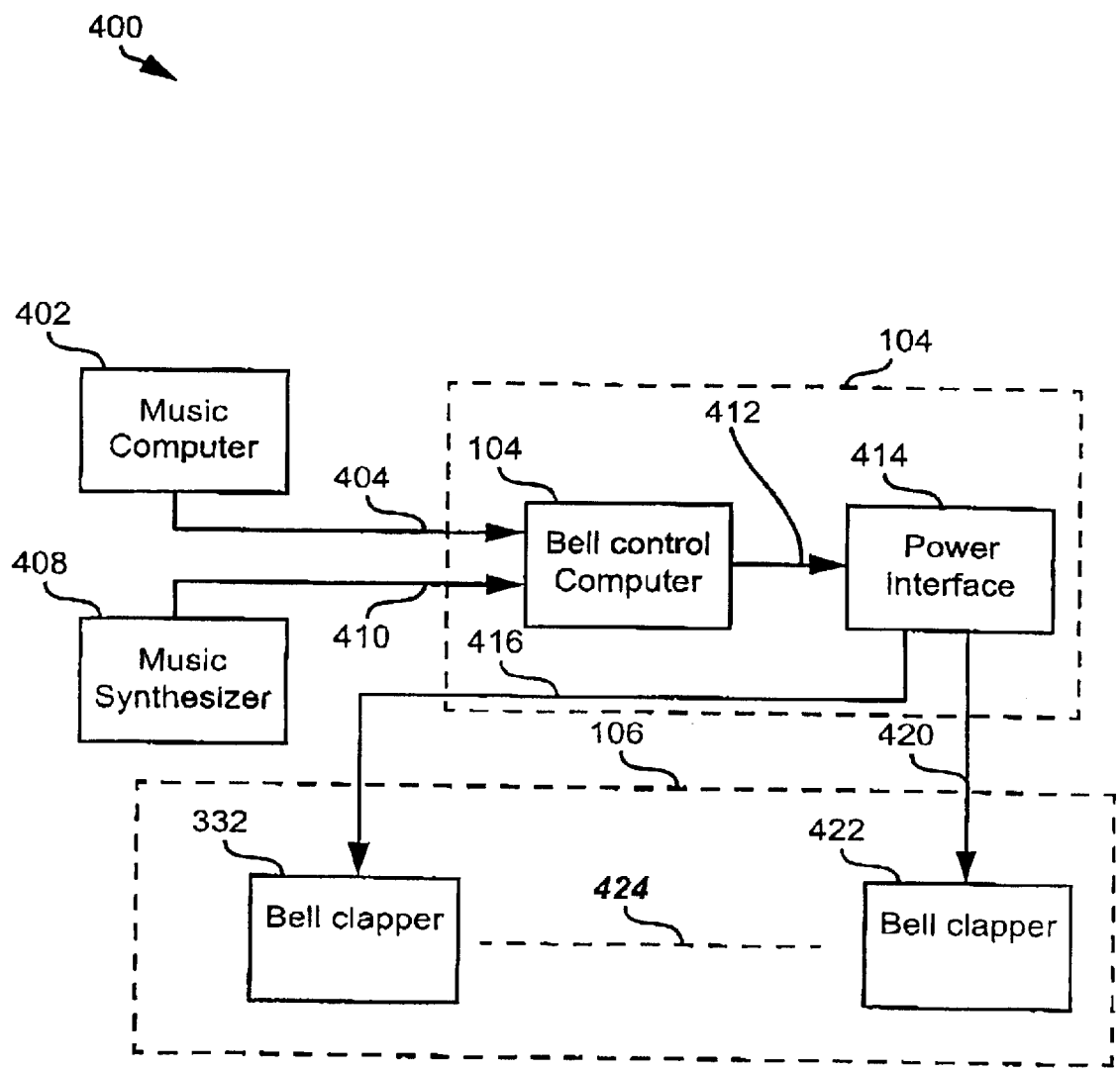
FIG. 4 shows details of a sound sub-system of FIG. 2.

FIG. 4 shows further details of the sound sub-system 102 of FIG. 2. The controller 104 receives music data from a music computer 402 and/or a music synthesizer 408 that are connected, as depicted by respective arrows 404 and 410, to a bell control computer 104. The music computer 402 and the music synthesizer 408 represent sources of music for input into the bell control computer 104 that stores the music so generated. The bell control computer 104 can also be provided with pre-recorded music in Read Only Memory (ROM) internal to the computer 104. The bell control computer 104 is connected, as depicted by an arrow 412, to a power interface 414. The power interface 414 drives, as depicted by arrows 416 and 420, bell clappers 332, . . . 424, . . . 422 in the bell clapper sub-system 106. It is also possible for a musician to drive the clapper sub-system 106 directly from the music synthesizer 408 if this is desired, by playing desired bell music directly on the synthesizer.

Figure 5:
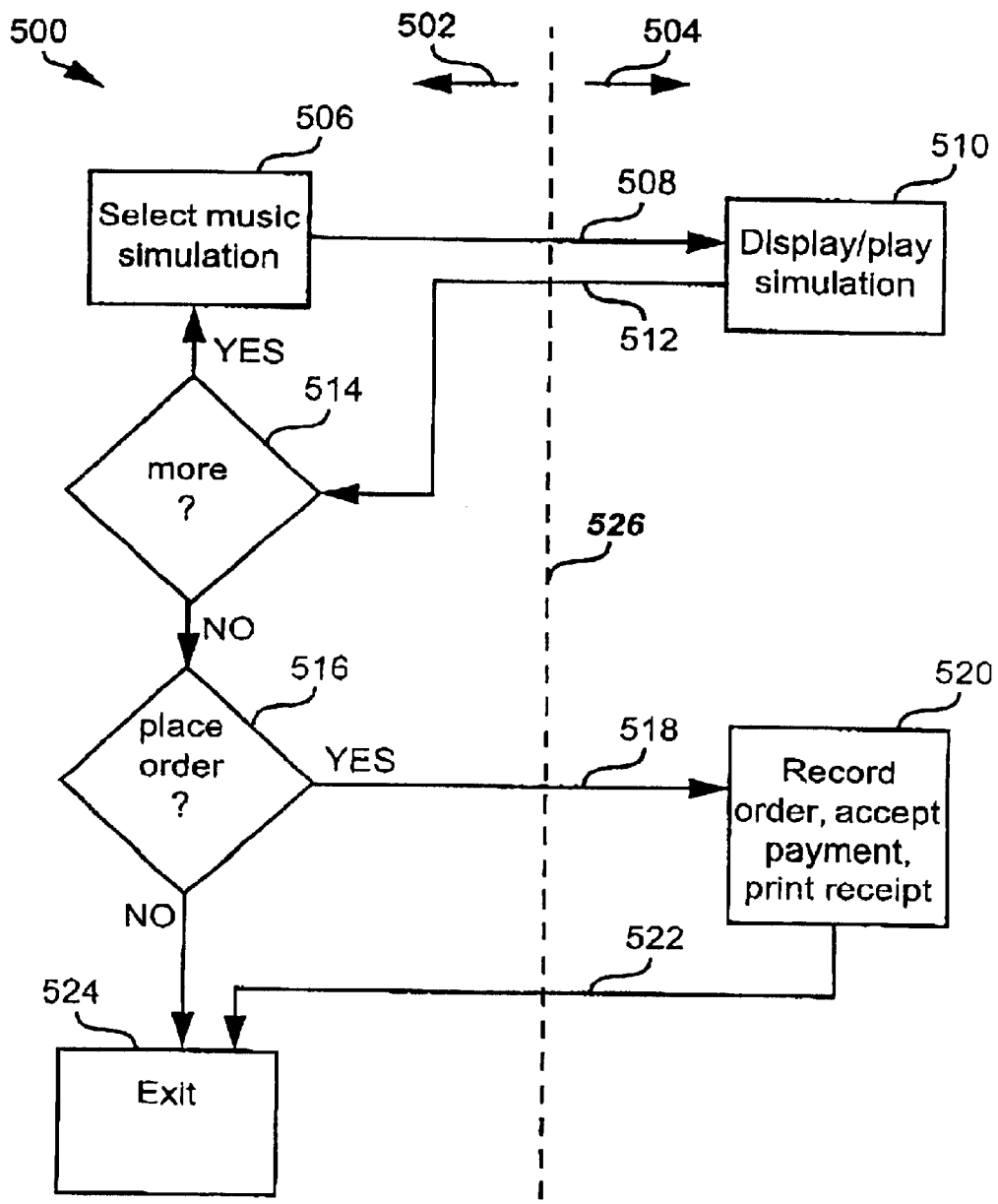
FIG. 5 shows one example of a flow chart for a process for booking a music mobile platform over the Internet.

FIG. 5 shows one example of a flow chart of a process 500 for booking one of the music mobile platforms 302 over the web site 124. FIG. 5 is divided by a dashed line 526. Process steps on the left-hand side of the line 526, as depicted by an arrow 502, represent method steps exercised by a user of the web site 124. Process steps on the right-hand side of the dashed line 526, as shown by an arrow 504, depict operations of the web site 124 itself The user commences the process 500 by logging onto the web site 124 (this process step is not shown explicitly) after which the user selects, in a step 506, a music simulation option provided by the web site. The process 500 is then directed in accordance with an arrow 508 to a step 510, whereby the web site 124 displays and plays a simulation of the music selection offered by the mobile platforms 302. This simulation can include audio selections of the available music repertoires, image representations of the mobile platforms, costs and other information of interest. Thereafter, the process 500 is directed in accordance with an arrow 512 to a testing step 514 which determines whether further simulations are required by the user. If this is the case, then the process 500 is directed in accordance with a "YES" arrow back to the step 506. If, on the other hand, no further simulations are required, then the process 500 is directed in accordance with a "NO" arrow to a testing step 516.

The step 516 determines whether an order is to be placed as a consequence of the user having seen and considered the simulation. If an order is to be placed, then the process 500 is directed in accordance with a "YES" arrow 518 to a step 520. The step 520 is performed by the software at the web site 124, which records an order, accepts payment from the user (by means of a credit card number, for example), prints out a receipt by sending an appropriate signal to the user's printer (not shown explicitly) or by sending an email and so on. The process 500 is then directed in accordance with an arrow 522 to a terminating step 524, at which point the user exists the web site 124. Returning to the testing step 516 if an order is not to be placed, then the process 500 is directed in accordance with a "NO" arrow to the terminating step 524.

Industrial Applicability

It is apparent from the above that the arrangements described are applicable to the music provision industry.

The foregoing describes only some embodiments of the present invention, and modifications and/or changes can be made thereto without departing from the scope and spirit of the invention, the embodiments being illustrative and not restrictive.

Thus the business of providing bell music at venues can take the form of either a sole proprietorship or a franchise. In the franchise arrangement, individual franchise territories can be set up, initially dividing the overall geographic area of interest into North, South, West and Eastern districts. A single franchise can be given in each territory, to start with, and further franchises given as the volume of business increases. The franchisee is required to pay an up front fee for the mobile platform, and ongoing charges are levied for services provided by the central office 120 (see FIG. 2). A percentage of franchisee profits can also be levied by the franchisor if this is desired.

What is claimed is:

1. A method of generating music using a plurality of bells, the method comprising the steps of:
   mounting said plurality of bells, in playable dispositions, on a mobile platform;
   transporting the mobile platform to a venue;
   striking, dependent upon electronic control, corresponding ones of the plurality of bells to thereby generate the music; and
   providing a commercial establishment regulating the generation of the music at the venue.

2. A method according to claim 1, wherein the striking step comprises one of the following:
   retrieving music stored in an electronic memory to thereby strike the bells in accordance with said retrieved music; and
   generating music using a manually operable music keyboard to thereby strike the bells in accordance with said generated music.

3. A method according to claim 1, wherein the establishing step comprises the sub-steps of:
   advertising the method;
   placing an order, for generation of the music at the venue, in response to said advertising; and
   making a payment in accordance with said order.

4. A method according to claim 3, wherein at least one of the advertising, placing and making steps are performed over the Internet.

5. A mobile church bell platform, adapted to deliver music at a desired venue using a plurality of church-type bells, the platform comprising:
   the mobile platform;
   said plurality of bells, coupled to the platform in playable dispositions;
   a sound sub-system functionally adapted to strike the bells, thereby producing church bell-type music dependent upon music data from one of a music storage memory and a music synthesizer; and
   an information system for at least one of (i) providing information relating to the location of the venue and a scheduled time at which the music is to be delivered, (ii) taking orders for future music delivery at other venues, and (iii) recording a payment for said delivery of the music at said venue.

6. A mobile church bell delivery system comprising:
   at least one mobile church bell platform according to claim 5;
   a central office administration sub-system including:
      a booking sub-system for recording booking information for events to which said music is to be delivered;
      a charging and billing system for attending to charging and billing for said events; wherein
         the administration sub-system is further adapted to communicate at least some of the booking information and charging information to the information system of the mobile church bell platform.

7. A mobile church bell delivery system according to claim 6, further comprising:
   a web-based booking system adapted to present at least one of:
      pieces of music for selection;
      image representations of available venues;
      pricing options; said web-based booking being further adapted to receive and record an order in respect of particular piece(s) of music, a particular venue and a particular price option.

8. A method of generating music at a wedding using a plurality of church bells, the method comprising the steps of:
   mounting said plurality of church bells, in playable positions, on a vehicular platform;
   advertising the method by presenting information relating to at least one of (a) a music repertoire that can be generated by the method, (b) a representation of the vehicular platform, and (c) corresponding costs for generating the music;
   placing an order for the generation of the music by selecting at least one of a part of the music repertoire, a vehicular platform, and a corresponding cost;
   transporting the ordered vehicular platform to the venue;
   providing data associated with the ordered music to a control computer;

activating, with the control computer in accordance with said data, bell clappers associated with the plurality of church bells to thereby strike at least some of the plurality of church bells and generate the music.

9. A method according to claim 8, wherein the advertising step comprises advertising the information on a web site; and the placing an order step comprises making selections over the Internet.

10. A method according to claim 8, wherein the method is performed by at least one of a sole proprietorship and a franchise.

* * * * *